Oct. 26, 1965 F. W. R. STARP 3,213,773
PHOTOGRAPHIC CAMERA WITH COUPLED EXPOSURE METER
Filed Feb. 18, 1963
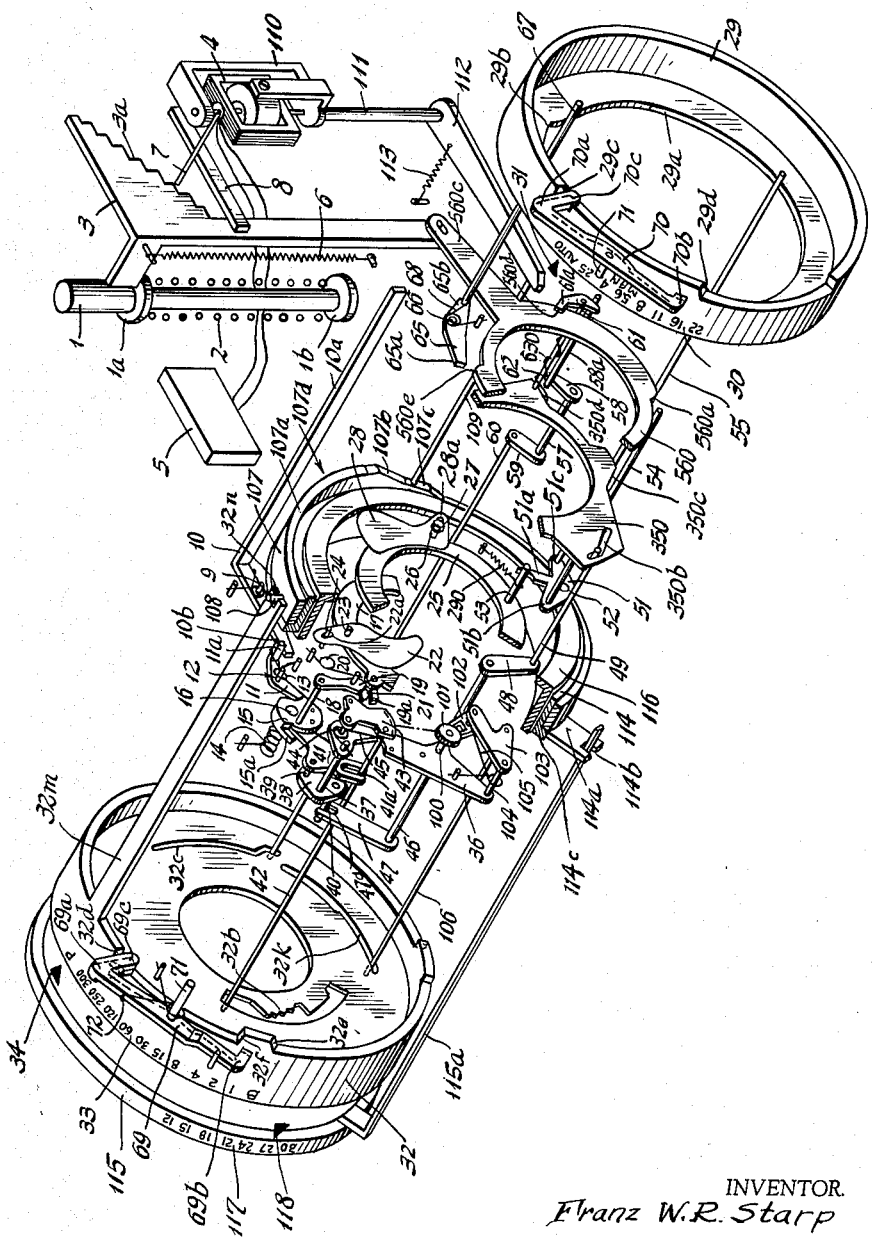
INVENTOR.
Franz W. R. Starp
BY
Arthur A. March
ATTORNEY

United States Patent Office 3,213,773
Patented Oct. 26, 1965

3,213,773
PHOTOGRAPHIC CAMERA WITH COUPLED
EXPOSURE METER
Franz W. R. Starp, Calmbach (Enz), Germany, assignor
to Alfred Gauthier, G.m.b.H., Calmbach (Enz), Germany, a corporation of Germany
Filed Feb. 18, 1963, Ser. No. 259,104
2 Claims. (Cl. 95—10)

This invention relates to photographic cameras having means to control the operation of both the shutter speed and the diaphragm aperture either manually or from an exposure meter built into the camera. More particularly the invention relates to a photographic camera provided with improved means connecting the shutter speed control to the exposure meter in order that photographs may be taken with manual control of the shutter speed and automatic operation of the diaphragm under the control of the exposure meter.

In operating a camera three parameters must be controlled in order to produce a satisfactory photograph. One is the duration of exposure, which is governed by the shutter speed control. The second is the amount of light striking the film, which is determined by the aperture size of the diaphragm. The third parameter is the sensitivity of the film, which is dependent upon the nature of the film emulsion and which determines the total quantity of light that must strike the film in order to create a desired latent image thereon. These parameters are not independent of each other but rather are interrelated. For example, it is possible to obtain a good photograph either by an exposure of long duration through a small aperture or by an exposure of short duration through a large aperture. Furthermore, when using smaller apertures and shorter times better photographs may be obtained with film of greater sensitivity than with less sensitive or so-called slower film.

The interrelation of these factors has been taken into account heretofore in cameras having built-in exposure meters and automatic linkages for controlling both the shutter speed and the diaphragm aperture. In essence the linkage connecting the shutter speed control mechanism to the exposure meter is at least partly separate from the linkage connecting the diaphragm aperture control to the exposure meter. However, as both linkages are necessarily operated simultaneously, a built-in program is provided in which a predetermined shutter speed is set and a predetermined aperture for the diaphragm is selected when a certain amount of light strikes the exposure meter. As a result a functional relationship appears to be established between each shutter speed in the permissible range of shutter speeds and a corresponding aperture size in the permissible range thereof.

Heretofore, the aforesaid program has been rendered modifiable to accommodate different film speeds. Also the linkages may be disconnected in order that the photographers may select the shutter speed and the diaphragm aperture independently of any influence by the exposure meter.

However, in certain instances it is desirable to manually select a shutter speed (for example a very fast shutter speed) while nevertheless retaining automatic control of the diaphragm aperture size and automatic compensation for films of different sensitivity. Attempts, heretofore made, to achieve this degree of flexibility of operation have involved moving the measuring mechanism of the exposure meter by means of a gear drive in response to the setting selected for the exposure duration. The use of a gear drive permits only a uniform change in the position of the measuring mechanism. This restricts the relative arrangement of the exposure time range and of the position, frequently called the "program," or "P," position, to which the time control must be set for completely automatic operation of the camera as well as the extent and development of the exposure time range.

Therefore, a principal object of the present invention is to provide a camera which is more flexible in its modes of operation than heretofore known cameras, viz., one which can be operated completely automatically, partially automatically or completely manually.

A further object of the present invention is to provide, in a camera suitable for operation in a multiplicity of modes, simple, inexpensive and yet flexible means for adjusting the operation to the different modes and particularly to a mode in which the shutter speed, or duration of exposure, is manually controlled while the diaphragm aperture size is automatically controlled.

Still another object of the present invention is to provide a camera with the aforesaid complete flexibility of operation but using only two simple and relatively inexpensive controls, specifically a shutter speed control and a diaphragm aperture control.

A still further object is to reduce the operating forces on the shutter speed control and to arrange the linkages so that the member that sets the camera for a fully automatic mode can be moved into operating position with the least possible moment of adjustment.

A shutter constructed in fulfillment of the foregoing objects includes only the same controls as cameras having no provisions at all for automatic operation. These controls are: A shutter speed control, a diaphragm aperture control, and a shutter release trigger. The shutter speed control may be set manually to any shutter speed, or exposure time, within a range that depends on the exact design, or it may be manually set to a so-called "program" position for automatic control of the shutter speed. The diaphragm aperture control may be set to any aperture size within a range that depends on the lens and on the diaphragm construction, or it may be set to a so-called "automatic" position at which the size of the aperture is automatically controlled. The controls are interlocked so that the aperture size may be automatically controlled independently of whether the shutter speed is automatically controlled or not, but the shutter speed control can only be set to its "program" position when the diaphragm aperture control has already been set to its "automatic" position.

The actual control of the shutter speed and aperture size is effected by means of linkages connected to a built-in exposure meter. The meter has a movable member that moves through a range of positions that correspond to the intensity of light from the scene at which the camera is aimed, and the position of this member is sensed by a sensing member of the aforementioned linkage when the shutter trigger is actuated to take a picture. Another part of this linkage is a program setting member which is capable of controlling both the mechanism that determines the shutter speed and the mechanism that sets the aperture size. Still another part of the linkage, called the automatic aperture setting control, which is more directly connected to the sensing portion, is also capable of controlling the mechanism that sets the aperture size. When the manual controls are set to permit automatic determination of the aperture size but manual control of the shutter speed, only the part of the linkage that includes the automatic aperture setting control is involved, and, in fact, one section of the linkage locks the program setting member to a fixed position. When completely automatic operation is chosen by setting the diaphragm aperture control to its "automatic" position and then the shutter speed control to its "program" position, the aforementioned lock is released and still another portion of the linkage connects the program setting member to the automatic aperture setting control, which then serves merely to transmit movement from the sensing member to the program setting member.

The invention will be described in greater detail hereinafter in connection with the drawing in which the only figure is a perspective view, elongated in the axial dimension, of a camera shutter constructed according to the invention and with parts broken away to show the working arrangements thereof.

In the drawing a camera release, or shutter trigger, 1 can be moved against the action of a compression spring 2 and is guided in a camera housing, which has not been shown for clarification purposes. A sensing member or feeler 3 is operatively connected to the trigger to engage a movable part 4 of an exposure meter which is installed in the camera and fed by the current of a photo-electric cell 5.

The sensing member 3 is in the form of a slide which is movable parallel to the shutter trigger 1 and is held against a collar 1a of the camera release 1 by means of a spring 6. The spring 6 is somewhat weaker than the spring 2 associated with the camera release 1, so that when the release is not actuated, the sensing member assumes its uppermost position, as shown in the drawing for co-operation with the movable meter part 4, the sensing member 3 has a stepped edge 3a, one of the steps of which engages a pointer 7 of the movable meter part upon depression of the shutter trigger 1. Under the action of the spring 6 the stepped edge 3a presses the pointer 7 against a stationary bar 8.

A collar 1b is provided on the trigger 1 which co-operates with a doubel-armed release lever 10 pivotally mounted on a stationary pin 9. One arm 10a of the release lever is bent at a right angle and lies in the path of movement of the collar 1b of the camera release, while a second arm 10b cooperates with a bent lug 11a of a locking lever 11. The lever 11 is pivotally supported by a stationary pin 12 and is held by a spring 13 against the arm 10b of the release lever 10. The lever 11 holds a main drive disc 15 of the shutter, which is resiliently biased by a drive spring 14, in the cocked position shown in the drawing. The disc 15 is arranged on a cocking shaft 16 which in its turn is connected with a well-known cocking device, such as the film transport mechanism of the camera.

The drive disc 15 actuates a shutter blade ring 17, and for this purpose, a pin 18 extends from the disc 15 and pivotally supports a drive pawl 19 which is biased by a spring 20 and acts by means of a notch 19a on a pin 21 of the shutter blade ring 17. The shutter blades 22, only one of which is shown for clarification purposes, are supported on pins 23 on the ring 17 and are guided by stationary pins 24 which extend through slots 22a. These elements operate in such a manner that, upon rotation of the drive disc 15 counter-clockwise, the shutter blades 22 are given a reciprocating movement for the opening and closing of the shutter.

Coaxial with the shutter blade ring 17, but axially spaced therefrom, is a diaphragm-actuating ring 25. It bears supporting pins 26 for diaphragm blades 28 which are guided by means of stationary pins 27 that engage slots 28a, a spring 290 resiliently biases the ring 25 in its starting position, which corresponds to the largest aperture.

To permit pictures to be taken with either automatic and non-automatic adjustment of the aperture, the camera has a diaprhagm aperture control ring 29 which can be set to an "AUTO" ((automatic) position and a "MAN" (manual or non-automatic) range. If this ring is in "AUTO" position, as shown in the drawing, the diaphragm actuating ring 25 is coupled in a manner which will be described in further detail below with the sensing member 3, and the setting of the diaphragm aperture takes place as a function of the position of the movable part 4 of the exposure meter. On the other hand, within the range marked "MAN," the diaphragm is adjusted manually by means of a cam surface 29a which is formed on the ring 29 and acts on the diaphragm-actuating ring 25. The desired aperture can be set manually by reference to an aperture scale 30, which is provided on the ring 29, and a stationary mark 31.

The camera also has a shutter speed setting ring 32 which can be set by reference to an exposure time scale 33 associated with it in conjunction with a stationary mark 34. Another adjustment position "P" (program) is provided adjacent the shutter speed range of the scale 33 on the ring 32. When the diaphragm aperture control 29 is also set to its "AUTO" position, an automatic adjustment of the exposure to a predetermined shutter speed aperture program is obtained as a function of the intensity of the illumination. In this way, with a camera and shutter mechanism of the type defined, it is possible in a simple, clear manner to take photographs in any of three modes: with manual exposure adjustment, with automatic aperture setting and manual setting of the shutter speed or with completely automatic exposure setting, or program setting.

For the automatic setting of the predetermined shutter speed aperture program, there is provided a rotatably mounted ring 350, hereinafter termed the program setting ring, which is connected to the sensing member 3 in a manner described later. The ring 350 has a cam surface 350b which, when the shutter speed setting ring 32 is set to the position "program," determines the setting of a shutter speed escapement mechanism, as is described in detail hereinafter. Another cam surface 350c on the ring 350 acts on the diphragm-actuating ring 25 and thus sets the aperture in case of a completely automatic exposure. The cam surfaces 350b and 350c can, for instance, be so developed that shutter speed-aperture combinations of from $\frac{1}{30}$ second and an aperture of 2.8 up to $\frac{1}{500}$ second and an aperture of 22 can be set.

The shutter speed escapement mechanism itself consists of a supporting plate 36 on which a double-armed lever 38 is supported around the pin 37. The two arms of this lever are provided with pins 39 and 40 which extend in opposite directions. An escapement brake lever 41 which cooperates with the drive disc 15 of the shutter and which is provided with a slot guide 41a is pivotally supported on the pin 39. An pin 42 engages the slot guide 41a and is fastened to a toothed segment 43 which is in engagement with other parts of the escapement. The segment 43 is pivotally mounted on a supporting pin 44 of the plate 36 and is under the action of a spring 45 which biases the escapement mechanism in the starting position shown in the drawing. The position depicted is associated with the slowest shutter speed, and is the position in which the pin 42 is against the plate 36.

The group of gears of the escapement mechanism, indicated by the dash-and-dot line, meshes with gear segment 43. This group of gears has, as its end member, an anchor wheel 101 which is positioned on a shaft 100 and with which a disconnectible escapement anchor 102 co-operates. The latter is pivotally mounted on a control lever 103, which is positioned on an axis 104 of the plate 36 and is urged in the counter-clockwise direction by a spring 105. In addition, the control lever 103 carries a pin 106 which engages into a control slot 32k of the shutter speed setting ring 32. This slot is formed in such a manner that the escapement anchor 102 is disconnected whenever the shutter speed setting ring 32 is set to its "program" position or to any of the speeds from 1/30 second to 1/500 second in its "manual" range of positions. However, when the shutter speed setting ring is set for exposure times longer than 1/30 second, the escapement anchor 102 comes into engagement with the anchor wheel 101, thereby correspondingly increasing the delaying effect of the escapement mechanism.

Different shutter speeds are obtained by means of the escapement mechanism by setting the brake lever 41 in different relative positions with respect to the lug 15a of the drive disc 15. The effect of doing so is that, as the drive disc 15 rotates, its lug 15a cooperates over a shorter or longer distance with the brake lever. The drive disc swings the lever 41 around the pin 39 and, after moving over a length of path which determines the duration of the exposure, passes out of engagement with the lever.

For setting the brake lever 41 when taking photographs with automatic program exposure, there is used, as already mentioned, the cam surface 350b which is located on the program setting ring 350 and acts on the carrier lever 38 of the brake lever 41. Between the cam surface 350b and the lever 38 is a transmission device which comprises, inter alia, a shaft 46 to one end of which is fastened a lever 47 having a forked end 47a that cooperates with the pin 40 of the lever 38. On the other end of the shaft is a lever 48 with a pin 49 that acts on the cam surface 350b.

The setting of the aperture is effected, in the case of pictures taken with automatic program exposure, by means of the cam surface 350c located on the program setting member 350, which cam surface cooperates with the diaphragm-actuating ring 25. Between the cam surface 350c and the ring 25 is inserted a transmission device which comprises a lever 51. This lever is pivotally supported on a pin 52 and has an arm 51a against which a pin 53 of the diaphragm-actuating ring 25 rests by virtue of pressure of the spring 290. The other arms 51b and 51c of the lever bear pins 54 and 55, respectively, the pin 54 cooperating with the cam surface 350c, while the pin 55 produces the connection with the cam surface 29a of the selector ring 29.

Shifting the shutter speed setting ring 32 from the "program" position to the shutter speed range marked by the scale 33 results not only in disconnecting the control surface 350b from the shutter speed escapement mechanism, but also in eliminating the control of the cam surface 350c from the diaphragm-actuating ring 25. This is effected by bringing into operation a cam surface 560a which, when the selector ring 29 is set at "AUTO" brings about the automatic setting of the aperture. The cam surface 560a is on a ring 560 which is connected by means of an arm 560c to the sensing member 3 and is referred to hereinbelow as the automatic aperture setting ring. It cooperates with the pin 54 of the transmission lever 51.

When the shutter speed setting ring 32 is moved from its "program" setting, the program setting member 350 is held fast by means of a locking device in the starting position shown in the drawing. In this position the cam surface 350c is outside the path of movement of the pin 54. The locking device comprises a locking lever 58 which is fastened on a shaft 57 and cooperates with a projection 350d of the program setting member 350. A lever 59, which engages, by means of a pin 60, in the control slot 32c of the shutter speed setting ring 32, is also provided on the shaft 57. When the shutter speed setting ring 32 is moved to its "manual" range 33 the lever 58 rotates counterclockwise from the position shown in the drawing so that it intercepts the projection 350d and holds the program setting member 350 from moving.

If the shutter speed setting ring 32 is in the "program" position, the ring 560 will be connected with the program setting ring 350. The connection between the two rings is produced by a lever 61 which is supported on ring 350 around pin 62 and is urged in the counterclockwise direction by a spring 630. For cooperation with the ring 560 the lever 61 has a projection 61a which can be brought into engagement with a notch 560d on the ring 560. Movement of the projection 61a into and out of engagement with the recess 560d is effected in the example shown by an arm 58a bent at an angle from the locking lever 58 and extending into the path of movement of the lever 61.

If the shutter speed setting ring 32 is set on its "manual" range 33, the connection between the rings 560 and 350 is interrupted and the ring 350 is locked in its starting position. When the ring 32 is set to the "program" position, the locking lever 58, on the other hand, releases the ring 350 and the lever 61 at the same time so that the latter can snap, under the action of its spring 630, into the recess 560d and thus produce the desired connection between the rings 560 and 350.

With the ring 560, there is also associated a locking lever 65, the purpose of which is to hold the ring 560 as well as the sensing member 3 in their initial positions shown in the drawing in case of non-automatic adjustment of the aperture by means of the selector ring 29, and in this way exclude their control action on the diaphragm actuating ring 25. The lever 65 is pivotally supported on a pin 66 and its arm 65a cooperates with the projection 560e of the automatic aperture setting ring 560. The other arm 65b of the lever bears a pin 67 which, because of the force of a spring 68, rests against the inner periphery of the selector ring 29. When the selector ring is in its "AUTO" position, the highest position of the cam surface 29a is opposite the pin 67 and holds the locking lever 65 in the inactive position shown in the drawing in opposition to the spring action. If the ring 29, on the other hand, is turned to its "MAN" range, the pin 67 passes into the region of the lower peripheral portion 29b of the ring 29. The resultant swinging movement of the lever 65 brings the arm 65a of said lever into the path of motion of the projection 560e of the automatic aperture setting ring 560 and locks the latter against clockwise movement. The cam surface 29a of the selector ring 29 now controls the setting of the aperture via the pin 55 and the lever 51 on the diaphragm actuating ring 25.

In case of exposures with automatic setting of the diaphragm or of shutter speed and diaphragm, the different settings of the shutter speed setting ring 32 can be taken into consideration by making the carrier for the movable measuring-mechanism member of the exposure meter rotatable in response to the adjusting motion of the ring 32, thereby causing a change in the relative position of the movable measuring-mechanism member. Heretofore, the connection between the shutter speed setting ring and the measuring mechanism carrier has been established by means of a gear drive. However, this has had the effect that the particular shutter speed of the shutter speed range adjoining, or proximal to the "program" setting position of the shutter speed setting member has been required to correspond to the shutter speed associated with the starting position of the program setting member, in which case the distance between the "program" setting position and the particular shutter speed of the shutter speed range has been adjusted by a corresponding reciprocal displacement of the cams 350c and 560a. Consequently, the cooperable connection between the shutter speed setting member and the measuring-mechanism carrier of the exposure meter, as provided heretofore, has prevented flexibility and freedom of choice with respect to the arrangement of the shutter speed range, especially the introduction of shutter speeds resulting in exposures longer than 1/30 sec., as well as with respect to the relative arrangement of the "program" setting position and of the "manual" range.

The present invention overcomes these restrictions by means of a cam ring 107, which is connected to the shutter speed setting ring 32 and which permits the position of the measuring mechanism of the exposure meter to be varied according to the setting of the shutter speed setting member. The cam ring 107 has a cam 107d which includes a first section 107a associated with the "manual" range 33 of the shutter speed setting ring 32, a second section 107c associated with the "program" setting position, and a third section 107d corresponding to the distance between the "manual" range and the "program" setting position.

Owing to this arrangement, a shutter speed range of any size and arrangement desired can be associated with the shutter speed setting member 32; likewise, the relative arrangement of the "manual" range and of the "program" setting position can be selected at will.

In the embodiment, the cam 107d is developed on the front face of the ring 107 which is arranged coaxially with the shutter speed setting ring 32 and is rotatably drivingly connected to the latter. The connection is effected by an arm 32m which extends axially from the shutter speed setting ring 32 and which has a forked end 32n that embraces a pin 108 on the ring 107. The cam sections 107a, 107b and 107c are located on the cam 107d. Of these cam sections, the first is a uniformly sloping section 107a associated with the "manual" range of the scale 33, while the section 107c corresponds to the "program" setting position of the shutter speed setting ring 32. Located between these two sections is the third section 107b, which corresponds to the distance between the "manual" range, and particularly the proximal portion thereof, and the "program" setting position. As is apparent, the scale 33 of the shutter speed range in the embodiment shown comprises exposure times from 1 sec. to 1/500 sec., the last-named time being followed by the "program" setting position of the shutter speed setting ring 32, whereas, in the "program" setting position, the shutter speed of 1/30 sec. is fed into the exposure meter by means of the cam section 107c. The bridging between 1/30 sec. of the "program" setting position and 1/500 sec. of the "manual" range on the cam is brought about by means of the comparatively steep section 107b. Appropriate shaping of the last-named section makes it possible to connect the "program" setting position to practically every shutter speed of the shutter speed range and, in addition, to select at will the relative arrangement of the shutter speed range and of the "program" setting position on the shutter speed setting ring 32. This ensures maximum flexibility and freedom of choice as regards the arrangement and the extent of the shutter speed range as well as the location of the "program" setting position. The position of the cam 107d is sensed by means of cam follower comprising an axially displaceable pin 109 and is transmitted to the rotatable carrier 110 of the measuring mechanism 4 of the exposure meter. The carrier 110 has an axle 111, on which a lever 112 is fixed, which is held against the free end of the pin 109 by means of a spring 13.

The position of the measuring mechanism of the exposure meter may also be influenced by the cam 107d in another manner. For example, the cam may actuate a shading device of a known kind arranged in front of the photocell 5 of the exposure meter or a variable resistance connected in the circuit of the light-intensity measuring device.

In order to make allowance for the sensitivity of the film which is being used, the invention further provides for the arrangement of a ring 114 which is coaxial with the ring 107 carrying the cam 107d and which is rotatable in response to the setting motion of a film sensitivity setting ring 115 and, upon being rotated, is displaceable in an axial direction by means of a cam control device on the ring 114 and on a fixed bearing cylinder. The ring 107 is freely rotatable with respect to the ring 114 and is axially displaceable by the same amount as ring 114 in response to the axial motion of the latter.

The cam control device for the ring 114 used in the present embodiment is a multiple thread on the lateral wall of the shutter housing 116 and on the inner circumference of the ring 114. The ring itself has a radially extending arm 114a with a forked end 114b which engages an arm 115a extending from the film sensitivity setting ring 115. The ring 114 also comprises a collar or flange 114c which engages the ring 107 carrying the cam 107d, due to the action of the spring 113. For the purpose of setting the film sensitivity, the ring 115 can be set with reference to a fixed indicator mark 118 by means of a film sensitivity scale 117 arranged on the ring 115. When this setting is effected, the ring 114 is rotated and is simultaneously displaced in axial direction by means of the cam control device. This axial displacement is transmitted by way of the collar 114c of the ring 114 to the cam carrying ring 107, thereby bringing about an adjustment of the measuring mechanism 4 of the exposure meter in accordance with the settings of the rings 115 and 32.

Between the rings 29 and 32, there is an alternate lock which permits the selector ring 29 to shift from "AUTO" position to "MAN" position and, on the other hand, permits the shutter speed setting ring 32 to shift from the "manual" shutter speed range to the "program" position only when the shutter speed setting ring is within the shutter speed range and the selector ring is in the "automatic" position respectively. The lock comprises two locking levers 69 and 70 which are fastened to a rotatable shaft 71 and are biased in clockwise direction by a spring 72 attached to lever 69. The arm 70a of the lever 70 cooperates with a recess 29c in the periphery of the ring 29 and associated with the "AUTO" position of the ring, while the lever 69 acts on the shutter speed setting ring 32 and rests, via its arm 69a, against a surface 32d of the ring. The shape of this cam surface is such that in the "program" position of the shutter speed setting ring, the arm 70a of the lever 70 engages under the action of the spring 72 into the recess 29c of the ring 29 and thus prevents displacement of the ring from the "AUTO" position into the "MAN" range. If, on the other hand, the shutter speed setting ring 32 is set to the shutter speed range of the scale 33, the lever 69 is swung in counterclockwise direction by the cam surface 32d engaging a cam edge 69c of the lever arm 69a. This causes the arm 70a of the lever 70 to be lifted out of the recess 29c of the ring 29 so that the ring 29 can now be set on the range characterized by "MAN." Within this range, the arm 70a of the lever 70 rests against a peripheral portion 29d of the ring 29, while the arm 69b of the lever 69 is in the path of motion of an edge 32e of the shutter speed setting ring 32. In this way, the return of the shutter speed setting ring to the "program" position is not possible as long as the selector ring 29 is set at the "MAN" range. Release of the locking of the shutter speed setting ring in the shutter speed range effected by the arm 69b takes place when the selector ring 29 is moved into the "AUTO" position, whereupon the arm 70a of the lever 70 drops into the recess 29c of the ring 29 so that the arm 69b of the lever 69 is moved out of the range of the edge 32e.

In order to make "B" exposures, there is also associated with the shutter speed setting ring 29 a "B" setting position which is located on the lefthand end of the shutter speed scale 33. When the shutter speed setting ring is set at "B," a device known per se and which is not shown in detail in order not to clutter the drawing, is connected to cooperate with a part of the shutter drive mechanism, for instance with the main drive disc 15 of the shutter, so that when a picture is taken, the disc 15 is held in a position corresponding to the open position of the shutter blades until the shutter trigger, or camera release 1, is again let go.

The setting of the shutter speed setting ring 32 to "B" is possible only when the aperture has been previously shifted by the selector ring 29 to manual adjustment. For this purpose, there is located on the shutter speed setting ring an edge 32f which, when the shutter reaches the speed time of 1 second, strikes against the arm 69a of the lever 69 when the selector ring 29 is in "AUTO" position. If the selector ring 29 is now brought to "MAN," the arm 70a of the lever 70 travels upward on the cam surface portion 29c by its cam edge 70c and turns the levers 70 and 69 counterclockwise. As a result, the arm 69a of the lever 69 is swung out of the path of the projection 32f so that the "B" lock is removed. In addition, the arm 69b of the lever 69 dips beyond the edge 32e of the exposure time setting ring and thereby makes it impossible to put the setting back at "program" position, as long as the ring 29 is not set at "AUTO" position. If the shutter speed setting ring 32 is then set to "B," the levers 69 and 70 are moved still farther in the counterclockwise direction by the cam edge 69c of the lever arm 69a adjoining the projection 32f. This causes the arm 70b of the lever 70 to drop behind the edge 29d of the ring 29 with the result that the ring 29 cannot be turned to "AUTO" position as long as the shutter speed setting ring 32 is at "B." Upon the two rings 29 and 32 being returned to "AUTO" and to "program," respectively, the above described locking devices are accordingly released or raised again in reverse order.

The manner of action and operation of the camera in accordance with the invention is as follows:

The camera in the drawing is set to automatic exposure setting determined by the intensity of illumination and the film speed set in accordance with a fixed predetermined shutter speed aperture program, for which purpose the shutter speed setting ring 32 has been brought into the position "P" and the selector ring 29 into the position "AUTO." If, with this setting of the camera, the trigger 1 is depressed to take a picture, the sensing member 3 follows this motion under the action of its spring 6 until one of the steps 3a comes against the meter pointer 7. Due to this movement of the sensing member, the program setting ring 350 is turned in clockwise direction. This, in its turn, forces the pin 49 of the lever 48, which cooperates with the shutter speed escapement mechanism, to slide along the setting cam surface 350b of the ring 350 and to adjust the shutter speed according to the path traversed by displacement of the lever 38 and thus of the brake lever 41. At the same time, due to rotation of the ring 350, the aperture setting cam surface 350c also enters into action by swinging the transmission lever 51 in the counterclockwise direction by way of the pin 54. The lever 51, in its turn, brings the diaphragm actuating ring 25 and the diaphragm blades 28, which are in operative connection with it, into a specific position which corresponds to the path traveled over by the ring 350. The automatic exposure setting in accordance with a fixed predetermined shutter speed aperture program is thus completed and upon further depression of the release 1, the shutter is now released to take the picture.

As soon as the pressure on the release 1 is removed after the picture has been taken, the sensing member 3 moves back again into its initial position under the action of the spring 2 acting on the release 1. The same is true of the ring 350 which is also returned into the position shown in the drawing.

In order to take pictures with automatic diaphragm setting controlled by the exposure meter it is merely necessary to rotate the shutter speed setting ring 32 to place the desired shutter speed contained in scale 33 opposite the fixed mark 34. This causes the braking lever 41 of the escapement mechanism to be set by the cam 32b and the pin 42 cooperating therewith. In addition, upon setting a longer exposure time than 1/30 sec., the anchor escapement of the shutter speed escapement mechanism comes into engagement with the anchor wheel 101. Moreover, a counterclockwise pivoting of the arresting lever 58 is effected by means of the cam 32c of the exposure time setting ring in response to the setting of the shutter speed range, whereby the program setting ring 350 is locked in its starting position and, in addition, the connection established by the lever 61 between the program setting ring and the automatic diaphragm setting ring 560 is released.

After the shutter speed has been set, the release member 1 of the camera can be actuated so that only the ring 560 is adjusted by way of the sensing member 3. Owing to this operation, the cam 560a associated with the ring 560 becomes operative and pivots the transmission lever 51 in the counterclockwise direction by way of pin 54. This motion of the transmission lever causes the setting of the diaphragm blades 28 in the manner described above.

Finally, in order to be able to set the camera completely independently of the influence of the exposure meter i.e., to set both the shutter speed and the diaphragm manually, a diaphragm setting cam 29a, as well as a diaphragm setting scale 30 are associated with the diaphragm control ring 29, as described above. If, in addition to setting the exposure time manually, the photographer also wishes to set the diaphragm manually, he only needs to rotate the diaphragm control ring 29 from the "AUTO" position to the right, until the desired diaphragm value on the scale 30 is opposite the fixed mark 31. During this operation, the setting cam 29a of the diaphragm control ring acts on the pin 55 of the transmission lever 51 and rotates the lever counterclockwise about its axis 52. Owing to the positive connection between the lever 51 and the pin 53, the diaphragm actuating ring 25 is rotated clockwise, and the diaphragm blades 28 are thereby moved into a position corresponding to the desired diaphragm aperture value.

In case of non-automatic setting of the diaphragm, the arresting lever 65 is shifted to its operative position, so that, upon actuation of the camera release member 1, the sensing member 3 and the automatic diaphragm setting ring 560 connected thereto remain in the starting position (shown in the drawing), in which their control influence on the diaphragm actuating ring 25 is eliminated.

While this invention has been described in terms of a single embodiment, it will be recognized by those skilled in the art that the true scope of the invention is not limited to this embodiment but is defined by the following claims.

What is claimed is:

1. A photographic camera having a built-in exposure meter; a diaphragm having means defining an aperture of variable size; a diaphragm aperture control connected to said diaphragm and settable to an "automatic" position; a film sensitivity control; a variable speed shutter; shutter operating means; a manually operated shutter speed control settable to a "program" position and to a range of manually controlled positions; an automatic aperture setting control operatively connected to said exposure meter to be controlled by the setting thereof and having a first cam surface thereon; a program setting ring having second and third cam surfaces thereon; engagement means connected to said shutter speed control to be operated thereby to connect said program setting means to said automatic aperture setting control when said shutter speed control is set to its "program" position and to disconnect said program setting means from said aperture setting control when said shutter speed control is set to its manually controlled positions, common means operatively engaging said diaphragm to control the aperture thereof and linked with both said first and second cam surfaces to be controlled by said first cam surface when said shutter speed control is set to its manually controlled positions and by said second cam surface when said shutter speed control is set to its "program" position; and means linking said shutter operating means to said third cam surface to control the speed of said shutter by the setting of said third cam surface only when said shutter speed control is set to its "program" position.

2. A photographic camera according to claim 1 comprising, in addition, a locking device linked to said shutter speed control to be governed thereby, said locking device engaging said program setting ring to prevent movement thereof when said shutter speed control is set to its manually controlled positions and being disengaged from said program setting ring when said shutter speed control is set to its "program" position.

References Cited by the Examiner

UNITED STATES PATENTS

| | | | |
|---|---|---|---|
| 3,013,478 | 12/61 | Gebele | 95—10 |
| 3,065,683 | 11/62 | Gebele | 95—10 |
| 3,071,054 | 1/63 | Singer | 95—10 |

NORTON ANSHER, *Primary Examiner.*